(12) United States Patent
Ishinabe et al.

(10) Patent No.: US 11,698,254 B2
(45) Date of Patent: Jul. 11, 2023

(54) SURVEYING INSTRUMENT HAVING WAVELENGTH DISPERSION COMPENSATION PRISMS AND SURVEYING INSTRUMENT SYSTEM

(71) Applicant: TOPCON Corporation, Tokyo-to (JP)

(72) Inventors: Ikuo Ishinabe, Tokyo-to (JP); Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 296 days.

(21) Appl. No.: 17/017,871

(22) Filed: Sep. 11, 2020

(65) Prior Publication Data

US 2021/0088333 A1    Mar. 25, 2021

(30) Foreign Application Priority Data

Sep. 25, 2019 (JP) ................................. 2019-173780

(51) Int. Cl.
  *G01C 15/00*        (2006.01)
  *G01C 15/02*        (2006.01)
  (Continued)

(52) U.S. Cl.
  CPC ......... *G01C 15/002* (2013.01); *G01C 15/004* (2013.01); *G01C 15/02* (2013.01); *G01S 7/4812* (2013.01); *G01S 17/08* (2013.01)

(58) Field of Classification Search
  CPC .... G01C 15/004; G01C 15/002; G01C 15/02; G01C 15/00; G01S 7/4812; G01S 17/08;
  (Continued)

(56) References Cited

U.S. PATENT DOCUMENTS 6,940,879 B2    9/2005 Zhang
2002/0085193 A1  7/2002 Ohtomo et al.
(Continued)

FOREIGN PATENT DOCUMENTS

JP       3-43623 U      4/1991
JP    2006-503275 A    1/2006
(Continued)

OTHER PUBLICATIONS

European communication dated Feb. 26, 2021 in corresponding European patent application No. 20197742.8.

*Primary Examiner* — Michael P LaPage
(74) *Attorney, Agent, or Firm* — Nields, Lemack & Frame, LLC

(57) ABSTRACT

A surveying instrument including an optical axis deflector which integrally deflects a distance measuring optical axis and a light receiving optical axis, a narrow-angle image pickup module having an optical axis a part of which is common to the distance measuring optical axis, a distance measurement calculation module and an arithmetic control module, in which the wavelength dispersion compensation prisms which is constituted of a plurality of optical members having the different wavelength characteristics are provided in the part of which is common to the distance measuring optical axis and the narrow-angle image pickup optical axis, the arithmetic control module performs the distance measurement of a measuring point based on a signal of the distance measuring light and a signal of the reflected distance measuring light, and acquires a narrow-angle image in which the dispersion has been compensated by the wavelength dispersion compensation prisms.

22 Claims, 8 Drawing Sheets

(51) Int. Cl.
*G01S 7/481* (2006.01)
*G01S 17/08* (2006.01)

(58) Field of Classification Search
CPC ........ G01S 7/4817; G01S 17/42; G01S 17/66;
G01S 17/86; G01S 17/89
See application file for complete search history.

(56) References Cited

U.S. PATENT DOCUMENTS

| | | | |
|---|---|---|---|
| 2004/0246498 A1* | 12/2004 | Kumagai | G01C 15/002 |
| | | | 356/614 |
| 2006/0158423 A1 | 7/2006 | Kern et al. | |
| 2016/0238708 A1 | 8/2016 | Ohtomo et al. | |
| 2016/0259039 A1 | 9/2016 | Ohtomo et al. | |
| 2016/0356888 A1* | 12/2016 | Ohnishi | G01S 17/10 |
| 2017/0138730 A1* | 5/2017 | Ohtomo | G01S 7/4972 |
| 2017/0168142 A1 | 6/2017 | Kumagai et al. | |
| 2018/0067195 A1* | 3/2018 | Slobodyanyuk | G01S 7/4815 |
| 2018/0106615 A1 | 4/2018 | Ohtomo et al. | |
| 2018/0329040 A1* | 11/2018 | Ohtomo | G01C 15/002 |
| 2019/0154805 A1 | 5/2019 | Ohtomo et al. | |
| 2022/0082675 A1* | 3/2022 | Ueno | G01S 7/497 |

FOREIGN PATENT DOCUMENTS

| | | |
|---|---|---|
| JP | 4356050 B2 | 11/2009 |
| JP | 2016-151423 A | 8/2016 |
| JP | 2016-161411 A | 9/2016 |
| JP | 2017-106813 A | 6/2017 |
| JP | 2018-66571 A | 4/2018 |

* cited by examiner

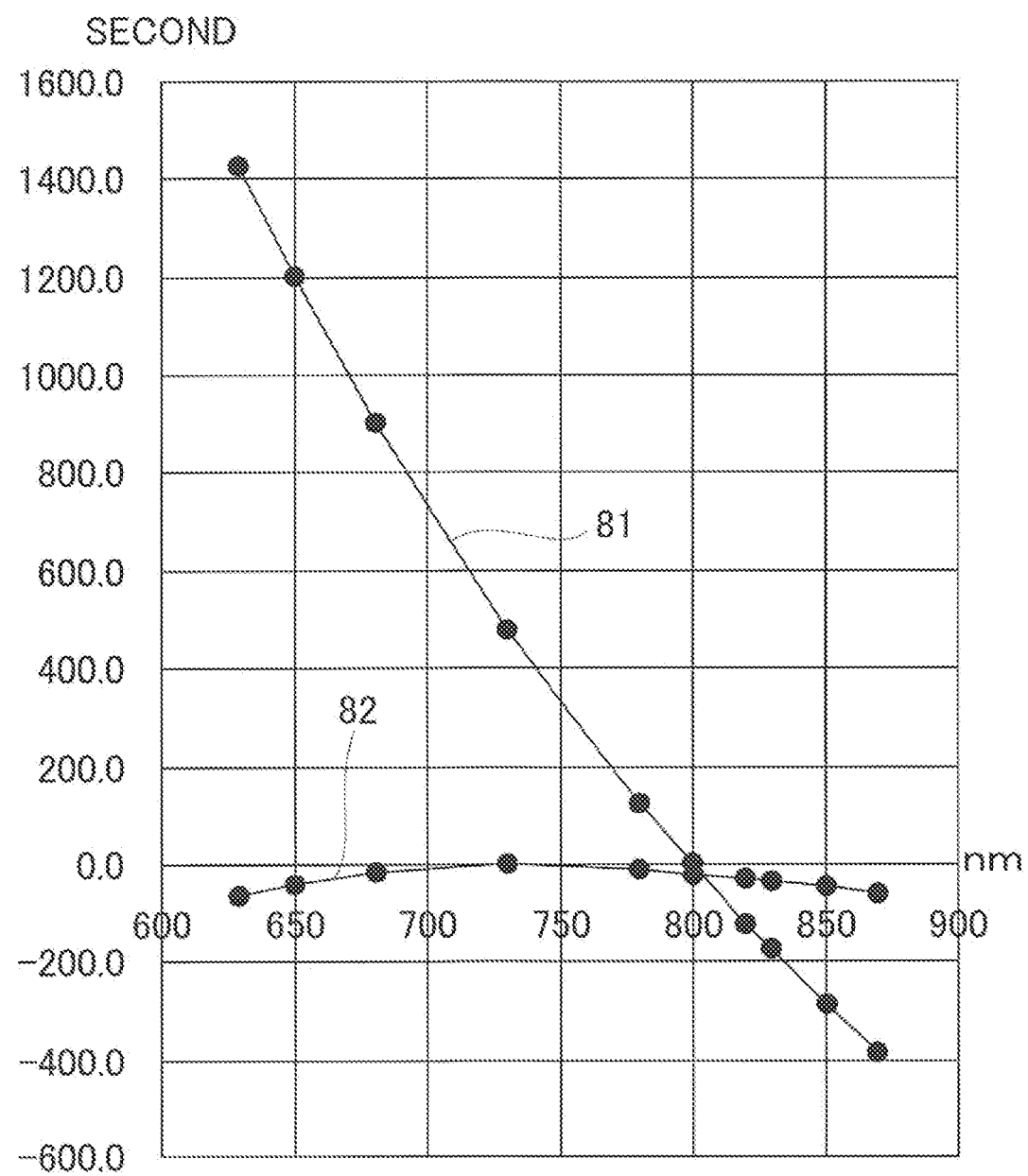

SURVEYING INSTRUMENT HAVING WAVELENGTH DISPERSION COMPENSATION PRISMS AND SURVEYING INSTRUMENT SYSTEM

BACKGROUND OF THE INVENTION

The present invention relates to a surveying instrument and a surveying instrument system which can acquire the wide-angle images and the narrow-angle images.

As a surveying instrument, there is a total station. In the total station, an object which is to be measured is sighted by a high-magnification telescope which also serves as a distance measuring optical system, and the measurement is performed. Further, the telescope is horizontally rotated/vertically rotated, the different objects are sighted, the sighting is sequentially performed in accordance with each of the different objects, and the measurement is performed. Alternatively, the telescope is horizontally rotated/vertically rotated following the movement of the object, the object is sighted while tracking the object, and the measurement is performed.

Further, in the surveying instruments, there is the surveying instrument which sights an object via a prism, performs the distance measurement, shares the prism and acquires an image. In case of acquiring a sighting image via the prism, the dispersion when the light is transmitted through the prism due to a difference in wavelength is unavoidable, and the image blurs.

To avoid a blur of the image, narrowing a wavelength band used for the acquisition of the images can be considered. In this case, to obtain a sufficient light quantity, an exposure time must be prolonged, and hence the tracking of the object and the image pickup during the tracking are difficult.

SUMMARY OF INVENTION

It is an object of the present invention to provide a surveying instrument and a surveying instrument system which can sight an object at a high speed and acquire an image at a sighting position.

To attain the object as a described above, a surveying instrument according to the present invention includes a distance measuring light projecting module configured to project the distance measuring light onto a distance measuring optical axis, a light receiving module configured to receive the reflected distance measuring light on a light receiving optical axis, an optical axis deflector which is constituted of the prisms and integrally deflects the distance measuring optical axis and the light receiving optical axis, a wide-angle image pickup module having substantially the same field angle as a maximum deflection range of the optical axis deflector, a projecting direction detecting module configured to detect an optical axis deflection angle and a deflecting direction by the optical axis deflector, a narrow-angle image pickup module having a field angle narrower than a field angle of the wide-angle image pickup module and having an optical axis a part of which is common to the distance measuring optical axis, a distance measurement calculation module and an arithmetic control module, wherein wavelength dispersion compensation prisms which is constituted of a plurality of optical members having the different wavelength characteristics are provided in the part of which is common to the distance measuring optical axis and the narrow-angle image pickup optical axis, the arithmetic control module configured to control the optical axis deflection of the optical axis deflector and a distance measuring operation of the distance measurement calculation module, the distance measurement calculation module configured to perform the distance measurement of a measuring point based on a signal of the distance measuring light and a signal of the reflected distance measuring light, and the narrow-angle image pickup module configured to acquire a narrow-angle image in which the dispersion has been compensated by the wavelength dispersion compensation prisms.

Further, in the surveying instrument according to a preferred embodiment, the optical axis deflector includes two disk prisms which are concentrically provided, and each of the disk prisms is constituted of a plurality of prisms having the same optical deflection characteristics, independently rotatable around the distance measuring optical axis and the light receiving optical axis, and has the wavelength dispersion compensation prism as a prism in at least a central portion.

Further, in the surveying instrument according to a preferred embodiment, an image processing module, wherein the image processing module configured to correct a magnification of the narrow-angle image corresponding to an optical axis deflection angle and a deflecting direction based on a detection result of the projecting direction detecting module.

Further, in the surveying instrument according to a preferred embodiment, the narrow-angle image pickup module has a tracking light receiving optical axis branched from a projecting optical axis of the distance measuring light projecting module and a tracking image pickup element provided on the tracking light receiving optical axis, and configured to acquire the narrow-angle image by the tracking image pickup element via the projecting optical axis.

Further, in the surveying instrument according to a preferred embodiment, a tracking module, wherein the tracking module having a tracking optical axis a part of which is common to the light receiving optical axis, a tracking light receiving optical axis branched from a projecting optical axis of the distance measuring light projecting module, a tracking light source provided on the tracking optical axis, and a tracking image pickup element provided on the tracking light receiving optical axis, wherein a tracking light configured to emit from the tracking light source is projected through the light receiving optical axis, the tracking light reflected on an object configured to be received by the tracking image pickup element through the projecting optical axis and the tracking light receiving optical axis, and the arithmetic control module configured to control the deflection of the optical axis deflector based on a deviation between a tracking light receiving position of the tracking image pickup element and the tracking light receiving optical axis.

Further, in the surveying instrument according to a preferred embodiment, the arithmetic control module configured to independently control the rotations of the two disk prisms, subject the distance measuring light to the two-dimensional closed loop scan and acquire the point cloud data.

Further, in the surveying instrument according to a preferred embodiment, the arithmetic control module configured to synchronize a distance measurement timing with the image acquisition performed by the narrow-angle image pickup module, and acquire a still image at an arbitrary position during a scan.

Further, in the surveying instrument according to a preferred embodiment, the arithmetic control module configured to associate the narrow-angle image with a wide-angle image based on a deflection angle and a deflecting direction detected by the projecting direction detecting module at the time of the image acquisition performed by the narrow-angle image pickup module and the positions of the pixels in the wide-angle image corresponding to the deflection angle and the deflecting direction.

Furthermore, in a surveying instrument system according to a preferred embodiment, a surveying instrument, a support device configured to install the surveying instrument, and an installation base unit which is a support module of the surveying instrument, wherein the installation base unit includes the rotation driving modules which rotate and drive the surveying instrument in the horizontal direction and the vertical direction and the angle detectors which detect a horizontal rotation angle and a vertical rotation angle, wherein the arithmetic control module configured to control the rotation driving modules of the optical axis deflector, perform the tracking of an object, and control the rotation driving modules of the installation base unit and the rotation driving modules of the optical axis deflector in such a manner that a deflection angle of a distance measuring optical axis detected by the projecting direction detecting module becomes 0.

According to the present invention, there is provided a surveying instrument including a distance measuring light projecting module configured to project the distance measuring light onto a distance measuring optical axis, a light receiving module configured to receive the reflected distance measuring light on a light receiving optical axis, an optical axis deflector which is constituted of the prisms and integrally deflects the distance measuring optical axis and the light receiving optical axis, a wide-angle image pickup module having substantially the same field angle as a maximum deflection range of the optical axis deflector, a projecting direction detecting module configured to detect an optical axis deflection angle and a deflecting direction by the optical axis deflector, a narrow-angle image pickup module having a field angle narrower than a field angle of the wide-angle image pickup module and having an optical axis a part of which is common to the distance measuring optical axis, a distance measurement calculation module and an arithmetic control module, wherein wavelength dispersion compensation prisms which is constituted of a plurality of optical members having the different wavelength characteristics are provided in the part of which is common to the distance measuring optical axis and the narrow-angle image pickup optical axis, the arithmetic control module configured to control the optical axis deflection of the optical axis deflector and a distance measuring operation of the distance measurement calculation module, the distance measurement calculation module configured to perform the distance measurement of a measuring point based on a signal of the distance measuring light and a signal of the reflected distance measuring light, and the narrow-angle image pickup module configured to acquire a narrow-angle image in which the dispersion has been compensated by the wavelength dispersion compensation prisms. As a result, a fine narrow-angle image with the reduced blurs or distortions can be acquired, and the sighting based on the narrow-angle image and the confirmation of the sighting can be easily carried out.

Further, according to the present invention, a surveying instrument, a support device configured to install the surveying instrument, and an installation base unit which is a support module of the surveying instrument, wherein the installation base unit includes the rotation driving modules which rotate and drive the surveying instrument in the horizontal direction and the vertical direction and the angle detectors which detect a horizontal rotation angle and a vertical rotation angle, wherein the arithmetic control module configured to control the rotation driving modules of the optical axis deflector, perform the tracking of an object, and control the rotation driving modules of the installation base unit and the rotation driving modules of the optical axis deflector in such a manner that a deflection angle of a distance measuring optical axis detected by the projecting direction detecting module becomes 0. As a result, an image of a measuring point can be constantly acquired, the confirmation of a position of the measuring point can be facilitated, an image near the optical axis can be provided, a focal depth can be increased, the focus adjustment can be simplified, a high speed and a high response can be achieved, and the extensive tracking is enabled.

BRIEF DESCRIPTION OF DRAWINGS

FIG. 6 is a graph showing a relationship between the wavelengths and the errors of the wavelength dispersion compensation prisms according to the present embodiment and the normal optical prisms.

DETAILED DESCRIPTION OF THE PREFERRED EMBODIMENT

A description will be given on an embodiment of the present invention by referring to the attached drawings.

Figure 1:
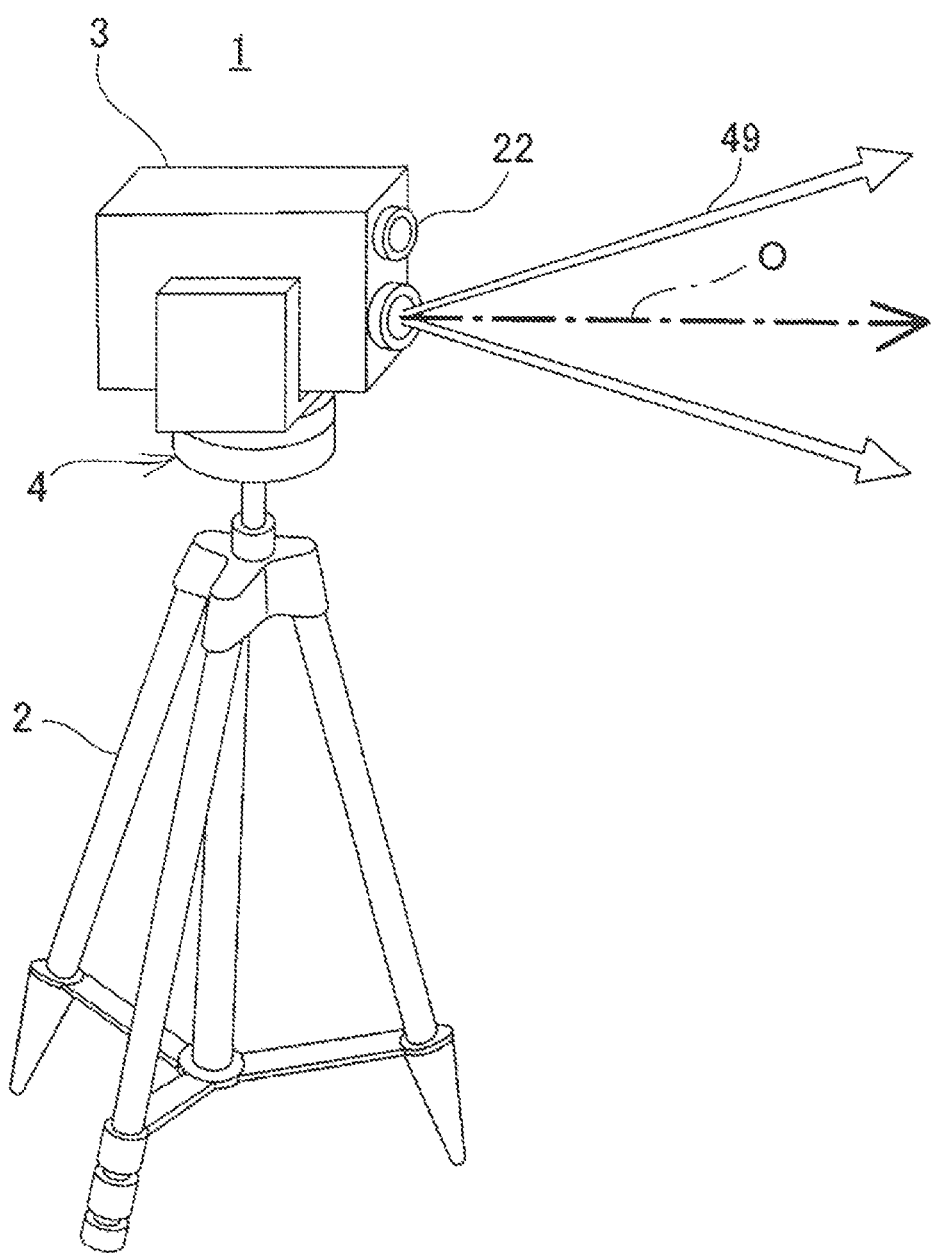
FIG. 1 is an external view of a surveying instrument system according to an embodiment of the present invention.
Figure 2:
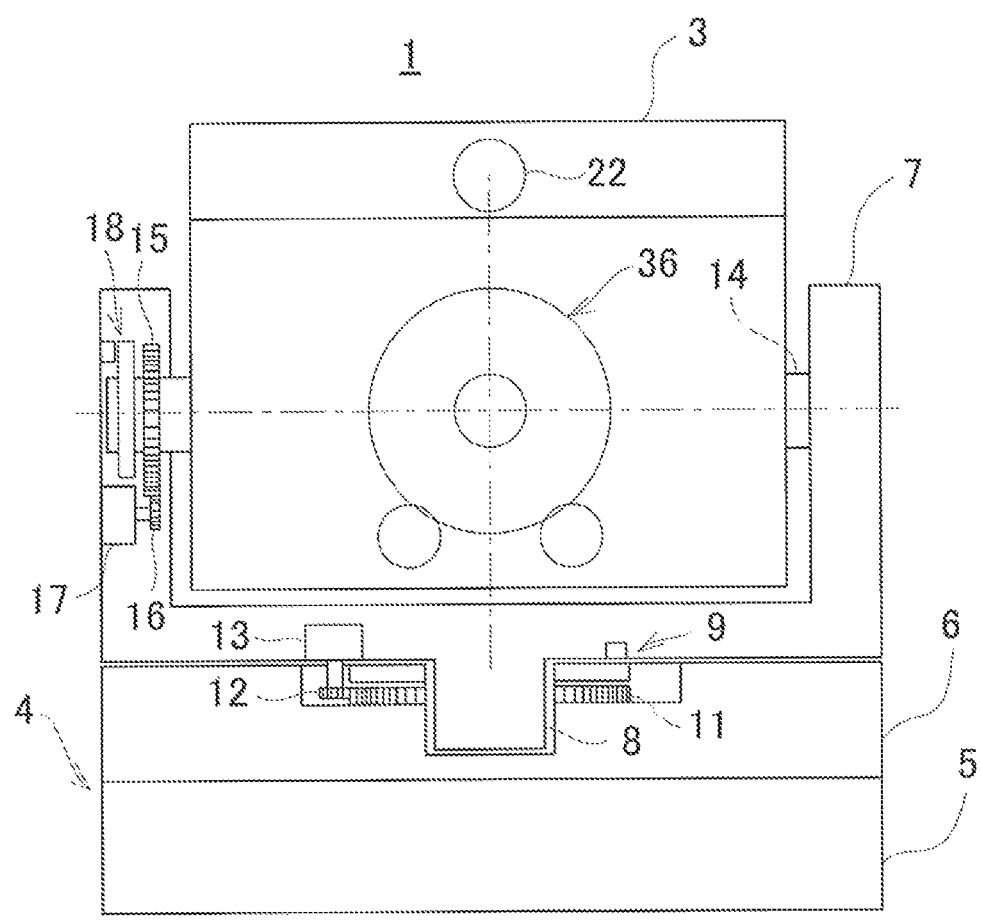
FIG. 2 is a front view of a surveying instrument in the surveying instrument system.
Figure 3:
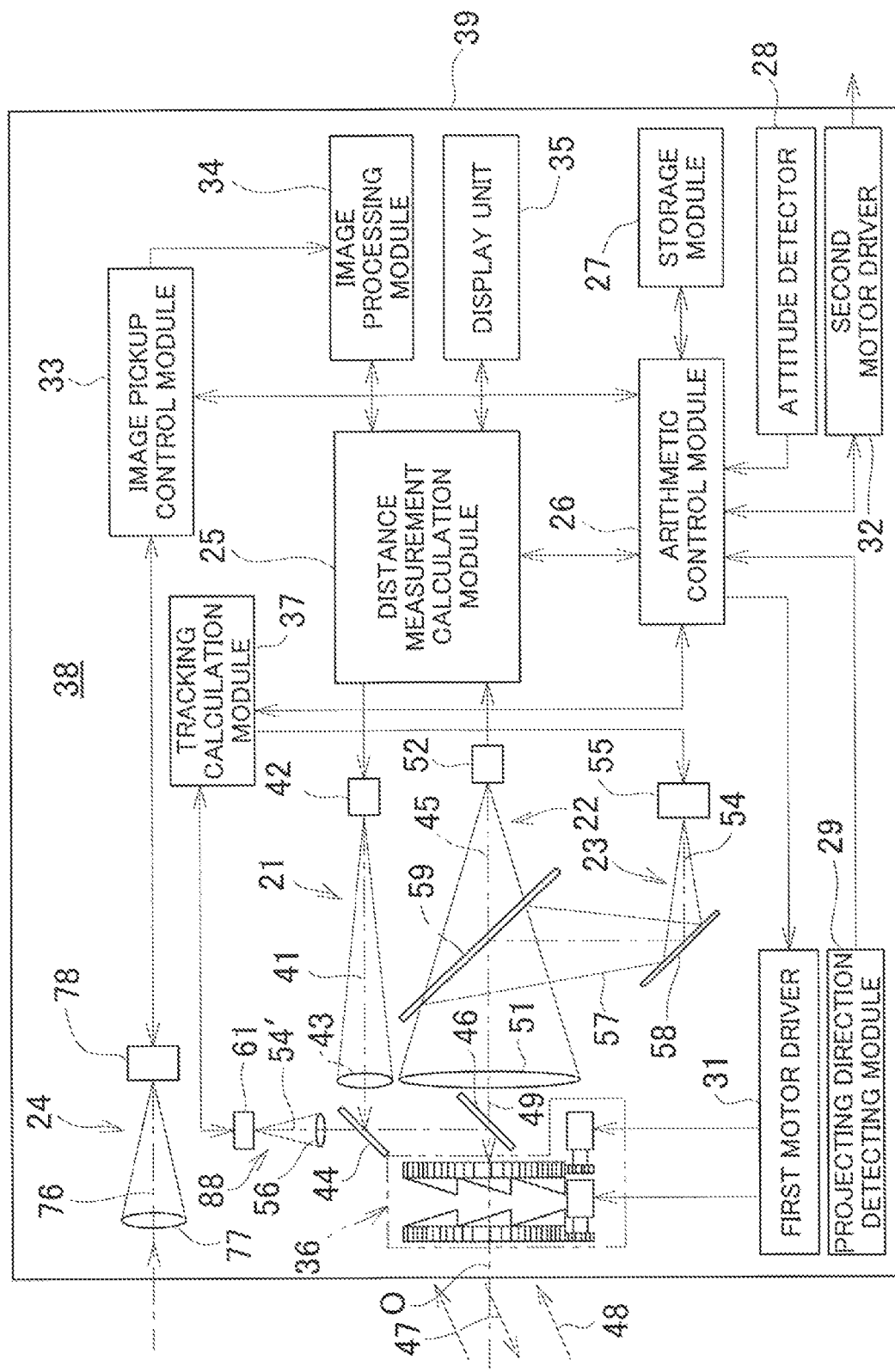
FIG. 3 is a schematical block diagram of the surveying instrument.

A surveying instrument according to the embodiment of the present invention by referring to FIG. 1 to FIG. 3.

In FIG. 1, a reference numeral 1 denotes a surveying instrument system, a reference sign O denotes a distance measuring optical axis in a state where an optical axis is not deflected and the distance measuring optical axis at this moment is determined as a reference optical axis.

The surveying instrument system 1 mainly has a tripod 2 as a support device, a surveying instrument 3 and an installation base unit 4 which is a support module of the surveying instrument 3.

The installation base unit 4 is mounted on an upper end of the tripod 2, the surveying instrument 3 is supported by the installation base unit 4 in such a manner that the surveying instrument 3 can rotate in an up-and-down direction and a left-and-right direction.

As shown in FIG. 2, the installation base unit 4 has a pedestal 5 fixed on an upper end of the tripod 2, a horizontal base 6 fixed and mounted on the pedestal 5, and a frame unit 7 provided on the horizontal base 6 so that the frame unit 7 can rotate in the horizontal direction. The surveying instrument 3 is mounted on the frame unit 7 so that the surveying instrument 3 can rotate in the vertical direction.

A horizontal rotation shaft 8 is protruded from a lower surface of the frame unit 7. The horizontal rotation shaft 8 is rotatably fitted in the horizontal base 6 via a bearing (not shown). The frame unit 7 can rotate around the horizontal rotation shaft 8 in the horizontal direction.

Further, a horizontal angle detector 9 (for instance, an encoder) which detects a horizontal angle (an angle in a rotating direction around the horizontal rotation shaft 8) is provided between the horizontal rotation shaft 8 and the horizontal base 6. A relative rotation angle in the horizontal direction of the frame unit 7 with respect to the horizontal base 6 is detected by the horizontal angle detector 9.

A horizontal rotation gear 11 is fixed to the horizontal base 6 concentrically with the horizontal rotation shaft 8, and a horizontal pinion gear 12 meshes with the horizontal rotation gear 11. A horizontal motor 13 is provided in the frame unit 7, and the horizontal pinion gear 12 is fixed to an output shaft of the horizontal motor 13.

By driving the horizontal motor 13, the horizontal pinion gear 12 rotates, and the horizontal pinion gear 12 revolves around the horizontal rotation gear 11. By the revolution of the horizontal pinion gear 12, the frame unit 7 and the surveying instrument 3 integrally rotate around the horizontal rotation shaft 8. That is, the surveying instrument 3 is rotated in the horizontal direction by the horizontal motor 13.

The surveying instrument 3 is supported by the frame unit 7 via a vertical rotation shaft 14. The surveying instrument 3 is rotatable in the vertical direction around the vertical rotation shaft 14 extending in the horizontal direction.

A vertical rotation gear 15 is fixed on one end of the vertical rotation shaft 14, and a vertical pinion gear 16 meshes with the vertical rotation gear 15. The vertical pinion gear 16 is fixed to an output shaft of a vertical motor 17 provided in the frame unit 7. By driving the vertical motor 17, the vertical pinion gear 16 is rotated. Further, the surveying instrument 3 is rotated in the vertical direction by the vertical motor 17 via the vertical rotation gear 15 and the vertical rotation shaft 14.

Further, a vertical angle detector 18 (for instance, an encoder) which detects a vertical angle (an angle in a rotating direction around the vertical rotation shaft 14) is provided between the vertical rotation shaft 14 and the frame unit 7. A relative rotation angle of the surveying instrument 3 with respect to the frame unit 7 in the vertical direction is detected by the vertical angle detector 18.

The horizontal motor 13 and the vertical motor 17 are driven by a second motor driver 32 (to be described later), and the horizontal motor 13 and the vertical motor 17 are driven and controlled by an arithmetic control module 26 (to be described later) as a control module via the second motor driver 32 in such a manner that a necessary rotation amount can be attained at a necessary timing.

A rotation amount of the horizontal motor 13 (that is, a horizontal angle of the frame unit 7) is detected by the horizontal angle detector 9. A rotation amount of the vertical motor 17 (that is, a vertical angle of the surveying instrument 3) is detected by the vertical angle detector 18.

That is, the horizontal angle and the vertical angle of the surveying instrument 3 are detected by the horizontal angle detector 9 and the vertical angle detector 18 respectively, and the detection results are input to the arithmetic control module 26 respectively. It is to be noted that the horizontal motor 13 and the vertical motor 17 constitute a rotation driving module.

The horizontal angle detector 9 and the vertical angle detector 18 constitute an angle detector which detects a vertical rotation angle and a horizontal rotation angle of the surveying instrument 3, that is, a direction angle detecting module.

A further description will be given on the surveying instrument 3 by referring to FIG. 3 and FIG. 4.

The surveying instrument 3 mainly includes a distance measuring light projecting module 21, a light receiving module 22, a tracking module 23, a wide-angle image pickup module 24, a distance measurement calculation module 25, the arithmetic control module 26, a storage module 27, an attitude detector 28, a projecting direction detecting module 29, a first motor driver 31, the second motor driver 32, an image pickup control module 33, an image processing module 34, a display unit 35, an optical axis deflector 36 and a tracking calculation module 37. They are accommodated and integrated in a casing 39. It is to be noted that the distance measuring light projecting module 21, the light receiving module 22, the distance measurement calculation module 25, and the optical axis deflector 36 constitute a distance measuring unit 38 having a function as an electronic distance meter.

As each of the distance measurement calculation module 25 and the arithmetic control module 26, a CPU specialized for the present embodiment, a general-purpose CPU, an embedded CPU, a microprocessor or the like is used. Further, as the storage module 27, a semiconductor memory such as a RAM, a ROM, a FlashROM or a DRAM, a magnetic recording memory such as an HDD, or an optical recording memory such as a CDROM is used.

In the storage module 27, the various types of programs for performing the present embodiment are stored, and the distance measurement calculation module 25 and the arithmetic control module 26 expand and execute the stored programs respectively. Further, in the storage module 27, the various types of data such as the measurement data, the image data or the like are stored.

The arithmetic control module 26 controls the optical axis deflector 36 via the first motor driver 31. Further, the arithmetic control module 26 controls the deflection of a distance measuring optical axis via the optical axis deflector 36, and performs the integration control of the distance measurement calculation module 25, the image pickup control module 33 and the tracking calculation module 37, the synchronization control of the distance measurement, the image pickup and the tracking, and other controls.

The attitude detector 28 detects a tilt of the surveying instrument 3 with respect to the horizontality or the verticality, and the detection results are input to the calculation control module 26. Further, as the attitude detector 28, a tilt detector such as a tilt sensor is used, and an attitude detection device disclosed in Japanese Patent Application Publication No. 2016-151423 can be used. The attitude detection device in Japanese Patent Application Publication No. 2016-151423 can detect a tilt which is 3600 or more in all directions in real time.

The distance measuring light projecting module 21 has a projecting optical axis 41, and a light emitter 42, for instance, a laser diode (LD) is provided on the projecting optical axis 41. Further, a light projecting lens 43 is provided on the projecting optical axis 41. Further, the projecting optical axis 41 is deflected in such a manner that the projecting optical axis 41 coincides with a light receiving optical axis 45 by a beam splitter 44 as a deflection optical member provided on the projecting optical axis 41 and a reflecting mirror 46 as a deflecting optical member provided on the light receiving optical axis 45 (to be described later). The reflecting mirror 46 has a shape which is equivalent to or slightly larger than a light flux diameter of the distance measuring light 47, and the reflecting mirror 46 has a size which substantially equivalent to a size of a wavelength dispersion compensation prism 65 and 68 (to be described later). The reflecting mirror 46 and the wavelength dispersion compensation prisms 65 and 68 occupy a limited portion having the light receiving optical axis 45 as a center.

The beam splitter 44 may be a half mirror, but the beam splitter 44 is desirably a polarization beam splitter having the polarization optical characteristics. For instance, the beam splitter 44 has the optical characteristics which reflect the light of the S-polarized light and transmit the light of the P-polarized light.

The beam splitter 44 and the reflecting mirror 46 constitute a projecting optical axis deflector.

The light emitter 42 pulse-emits a laser beam or burst-emits a laser beam. The distance measuring light projecting module 21 projects the pulsed laser beam (or the burst-emitted laser beam) emitted from the light emitter 42 as the distance measuring light 47. It is to be noted that the burst emission is disclosed in Japanese Patent Application Publication No. 2016-161411.

A description will now be given on the light receiving module 22. The reflected distance measuring light 48 from an object which is to be measured enters the light receiving module 22. The light receiving module 22 has the light receiving optical axis 45, the projecting optical axis 41 deflected by the beam splitter 44 and the reflecting mirror 46 coincides with the light receiving optical axis 45.

It is to be noted that a state where the projecting optical axis 41 coincides with the light receiving optical axis 45 is determined as a distance measuring optical axis 49 (see FIG. 1).

The optical axis deflector 36 is disposed on the reference optical axis "O". The reference optical axis "O" is a straight optical axis which is transmitted through the center of the optical axis deflector 36. The reference optical axis "O" coincides with the projecting optical axis 41, the light receiving optical axis 45, a tracking optical axis 54 (to be described later) and the distance measuring optical axis 49 when no deflection has been performed by the optical axis deflector 36.

An image forming lens 51 is disposed on the light receiving optical axis 45 transmitted through the optical axis deflector 36. Further, a photodetector 52 is provided on the light receiving optical axis 45. The photodetector 52 is, for instance, a photodiode (PD), an avalanche photodiode (APD), or an equivalent photoelectric conversion element. The image forming lens 51 forms an image of the reflected distance measuring light 48 on the photodetector 52. The photodetector 52 receives the reflected distance measuring light 48, and generates a light reception signal. The light reception signal is input to the distance measurement calculation module 25. The distance measurement calculation module 25 performs the distance measurement to an object (the electro-optical distance measurement) based on a signal of the distance measuring light 47 and a signal of the reflected distance measuring light 48. As the signal of the distance measuring light 47 and the signal of the reflected distance measuring light 48, it is possible to use the various types of signals, for instance, a light emission timing signal of the distance measuring light 47, a light reception timing signal of the reflected distance measuring light 48, a phase signal of the distance measuring light 47 and a phase signal of the reflected distance measuring light 48 (a phase difference signal) or the like.

It is to be noted that, as the measurement, the prism measurement in which the object has the retroreflective properties or the non-prism measurement in which the object has no retroreflective properties is performed.

The optical axis deflector 36, the image forming lens 51, the photodetector 52 constitute the light receiving module 22.

A description will be given on the tracking module 23. The tracking module 23 has the tracking optical axis 54, and a tracking light source 55, a reflecting mirror 58, a split mirror 59, the image forming lens 51, the reflecting mirror 46 and the optical axis deflector 36 are disposed on the tracking optical axis 54. The tracking optical axis 54 is deflected by the reflecting mirror 58 and the split mirror 59, and coincides with the light receiving optical axis 45 and the distance measuring optical axis 49. Here, the image forming lens 51 functions as a light projecting lens in the tracking module 23.

It is to be noted that, as the tracking light source 55 which emits the tracking light 57, a light emission source such as a laser diode (LD) is used. It is desirable for the tracking light 57 and the distance measuring light 47 to have the same wavelength. As the tracking light 57, the red to near-infrared light, for instance, the light in a wavelength band ranging from 650 nm to 850 nm is used. Alternatively, the light including the light in a wavelength band ranging from 650 nm to 850 nm is used. Further, as the tracking light source 55, a light beam emitted from a laser diode may be guided via an optical fiber, and a projection end face of the optical fiber may be used as the tracking light source. Further, as an optical characteristic of the tracking light 57, an unpolarized light beam (a light beam having no polarization properties) is adopted.

The split mirror 59 may be a half mirror, but it may be a non-polarization split mirror having a transmission light quantity and a reflection light quantity different from each other. A light quantity ratio of the transmission light quantity and the reflection light quantity can be appropriately set in correspondence with the performance required for the measurement device. For instance, the transmission light quantity: the reflection light quantity=7:3 is set. It is to be noted that, to avoid a reduction in distance measurement light quantity, it is preferable to use a polarization beam splitter which reflects the S-polarized light as the beam splitter 44.

Further, in a case where the polarization beam splitter is used as the beam splitter 44, the distance measuring light 47 and the tracking light 57 have the different polarization characteristics. For instance, the distance measuring light 47 emitted from the light emitter 42 is the S-polarized light, and the tracking light 57 emitted from the tracking light source 55 is the unpolarized light.

In this case, the tracking light 57 emitted from the tracking light source 55 is partially (for instance, 3/10) reflected by the split mirror 59. Further, the reflected tracking light is the unpolarized light, the beam splitter 44 is the polarization beam splitter, and hence the reflected tracking light is transmitted through the beam splitter 44 by 50%. The distance measuring light which is the S-polarized light emitted from the light emitter 42 is totally reflected by the beam splitter 44, and the reflected distance measuring light reflected on the object is partially (for instance, 7/10) transmitted through the split mirror 59.

The tracking light 57 is turned to a parallel light flux by the image forming lens 51, transmitted through the optical axis deflector 36, and irradiated coaxially with the distance measuring light 47. The reflected tracking light reflected on the object has the same optical axis as the reflected distance measuring light 48 (that is, the distance measuring optical axis 49), enters the optical axis deflector 36, is transmitted through the optical axis deflector 36, and then reflected by the reflecting mirror 46.

The reflecting mirror 46 separates a tracking light receiving optical axis 54' from the distance measuring optical axis 49. The beam splitter 44 is disposed on the tracking light receiving optical axis 54', and an image forming lens 56 and a tracking image pickup element 61 are disposed on the tracking light receiving optical axis 54'. That is, the tracking light receiving optical axis 54' has an optical axis a part of which is common to the distance measuring optical axis 49.

The tracking image pickup element 61 is a CCD or a CMOS sensor which is an aggregate of the pixels, and each pixel can specify a position on the image pickup element. For instance, each pixel has pixel coordinates in a coordinate system with the tracking light receiving optical axis 54' as an origin, and a position on the image pickup element can be specified by the pixel coordinates.

The tracking image pickup element 61 receives the reflected tracking light reflected on the object, generates a light reception signal and the light reception signal is input to the tracking calculation module 37. The light reception signal is generated in accordance with each pixel, and the light reception signal generated from each pixel has positional information of the pixel. The tracking calculation module 37 calculates the tracking control information required for the tracking based on a light receiving position of the reflected tracking light on the tracking image pickup element 61. For instance, a deviation between an image center of a narrow-angle image and a light receiving position is calculated.

Some of the functions of the arithmetic control module 26 may be assigned to the tracking calculation module 37. Alternatively, as the tracking calculation module 37, a CPU, an embedded CPU, a microprocessor or the like may be used.

It is to be noted that the tracking control information is, for instance, the information to calculate a positional deviation between the tracking light receiving optical axis 54' on the tracking image pickup element 61 and the light receiving position and a direction of the deviation, and make the position of the light receiving position coincide with the tracking light receiving optical axis 54'. The tracking control information includes the control information of the optical axis deflector 36 which controls a rotation amount and a rotating direction of each of the disk prisms 63 and 64 (to be described later) based on the calculation results of the positional deviation of the light receiving position and the direction of the deviation.

The tracking calculation module 37 inputs the tracking control information to the arithmetic control module 26. The arithmetic control module 26 controls the rotations of the disk prisms 63 and 64 based on the tracking control information, and performs the tracking. It is to be noted that the tracking calculation module 37 may perform the tracking based on a tracking control signal.

The tracking light source 55, the reflecting mirror 58, the split mirror 59, the image forming lens 51, the optical axis deflector 36, the beam splitter 44, the image forming lens 56, the tracking image pickup element 61, and the tracking calculation module 37 constitute the tracking module 23.

Further, the background light including the object enters the tracking module 23 together with the tracking light 57. The tracking image pickup element 61 receives the background light together with the tracking light 57, and a background image including the object is acquired. Therefore, the tracking module 23, and the tracking image pickup element 61 also function as a narrow-angle image pickup module 88 which acquires a background image of a measuring point and the measuring point of the neighborhood. In this case, the tracking optical axis 54 and the tracking light receiving optical axis 54' become equal to a narrow-angle image pickup optical axis of the narrow-angle image pickup module 88. It is to be noted that the background light alone which has been transmitted through the wavelength dispersion compensation prisms 65 and 68 (to be described later) enters the tracking image pickup element 61. That is, the narrow-angle image pickup optical axis has an optical axis a part of which is common to the distance measuring optical axis 49.

Therefore, the tracking module 23 may be configured to also serve as the narrow-angle image pickup module 88, an image acquired from the tracking image pickup element 61 may be acquired as a narrow-angle image, and the narrow-angle image may be acquired as a background image of a sighting position (a measuring point) of the distance measuring optical axis 49. It is to be noted that a center of the narrow-angle image (an image center) becomes the distance measuring optical axis 49, that is, the measuring point.

Further, in a case where the tracking module 23 also serves as the narrow-angle image pickup module 88, in a state where the tracking is being performed, the tracking light source 55 is turned on, and the irradiation using the tracking light 57 is carried out. The tracking image pickup element 61 receives the background light together with the reflected tracking light. Therefore, the tracking module 23 can acquire a tracking image in a tracking state. Further, in a state where no tracking is being performed, the tracking light source 55 may be turned off, and the background light of a sighting position may be received. In this case, the tracking module 23 operates as the narrow-angle image pickup module 88 only and acquires a narrow-angle background image in a sighting direction (a direction of the distance measuring optical axis 49).

The narrow-angle image pickup module 88 receives a limited light flux near the tracking light receiving optical axis 54' which has been transmitted through a central portion of the optical axis deflector 36, that is, the wavelength dispersion compensation prisms 65 and 68 and reflected by the reflecting mirror 46. A field angle of the narrow-angle image pickup module 88 is as narrow as, for instance, approximately 3°, and a narrow-angle image has a deep focal depth. Therefore, a focusing mechanism can be omitted or simplified for the narrow-angle image pickup module 88, and an image in a distance measurement range can be acquired with the use of a single focus.

A description will be given on the optical axis deflector 36 by referring to FIG. 4, FIG. 5A and FIG. 5B.

The optical axis deflector 36 includes the pair of disk prisms 63 and 64. The disk prisms 63 and 64 have disk shape with the same diameter, respectively, are arranged concentrically on the light receiving optical axis 45 while crossing the light receiving optical axis 45 (the distance measuring optical axis 49) at a right angle, and are arranged in parallel at a predetermined interval. The disk prism 63 is molded of the optical glass. Further, the disk prism 63 has a plurality of prism columns arranged in parallel and a wavelength dispersion compensation prism 65 arranged at a central portion as a basic configuration. The wavelength dispersion compensation prism 65 is a composite prism formed by attaching an optical prism 65a and an optical prism 65b to each other. It is to be noted that, in the drawing, the disk prism 63 has three prism columns (for instance, the rod-shaped triangular prisms, hereinafter triangular prisms) 66a, 66b and 66c. It is to be noted that, the disk prisms 63 and 64 (the wavelength dispersion compensation prisms 65 and 68) are provided on an optical axis a part of which is common to the distance measuring optical axis 49 and the narrow-angle image pickup optical axis.

Similarly, the disk prism 64 is molded of the optical glass. Further, the disk prism 64 has three prism columns 67a, 67b and 67c (for instance, the rod-shaped triangular prisms, hereinafter triangular prisms) arranged in parallel and a wavelength dispersion compensation prism 68 arranged at a central portion as a basic configuration. The wavelength dispersion compensation prism 68 is a composite prism formed by attaching an optical prism 68a and an optical prism 68b to each other. It is to be noted that the triangular prisms 66a, 66b and 66c and the triangular prisms 67a, 67b and 67c all have the optical deflection characteristics of the same deflection angle. Further, the optical deflection characteristics of the wavelength dispersion compensation prisms 65 and 68 are also configured to be the same as the optical deflection characteristics of the triangular prisms 66a, 66b and 66c and the triangular prisms 67a, 67b and 67c.

The wavelength dispersion compensation prism 65 and the wavelength dispersion compensation prism 68 have the same configuration and are point-symmetrically arranged. Further, the sizes of the wavelength dispersion compensation prisms 65 and 68 (the lengths of the triangular prisms 66a and 67a in the longitudinal direction and the width direction) are larger than the beam diameters of the distance measuring light 47 and the tracking light 57, and the distance measuring light 47 and the tracking light 57 are transmitted through the wavelength dispersion compensation prisms 65 and 68 alone. Further, the lengths in the axial direction (the lengths in the optical axis direction) of the wavelength dispersion compensation prisms 65 and 68 are longer than the triangular prisms 66a, 66b and 66c. That is, the wavelength dispersion compensation prisms 65 and 68 protrude from the disk prisms 63 and 64 in the axial direction It is to be noted that the widths of the triangular prisms 66a and 67a may be equivalent to the widths of the wavelength dispersion compensation prisms 65 and 68 or may be larger than widths of the wavelength dispersion compensation prisms 65 and 68. In a case where widths of the triangular prisms 66a and 67a are equivalent to the widths of the wavelength dispersion compensation prisms 65 and 68, two split triangular prisms of each of the triangular prisms 66a and 67a sandwich each of the wavelength dispersion compensation prisms 65 and 68.

The wavelength dispersion compensation prisms 65 and 68 are a distance measuring light deflector which transmits the distance measuring light 47 and projects the distance measuring light 47. Further, the portions excluding the wavelength dispersion compensation prisms 65 and 68 (the both end portions of the triangular prisms 66a and 67b, the triangular prisms 66b and 66c, and the triangular prisms 67b and 67c) form a reflected distance measuring light deflector which transmits the reflected distance measuring light 48 and the reflected distance measuring light 48 enters.

The disk prisms 63 and 64 are arranged so that each of the disk prisms 63 and 64 can independently and individually rotate around the light receiving optical axis 45. Since the rotating directions, the rotation amounts and the rotation speeds of the disk prisms 63 and 64 are independently controlled, the projecting optical axis 41 of the distance measuring light 47 to be projected is deflected in an arbitrary direction. Further, the disk prisms 63 and 64 deflect the light receiving optical axis 45 of the reflected distance measuring light 48 to be received parallel with the projecting optical axis 41.

Outer shapes of each of the disk prisms 63 and 64 are circular around the light receiving optical axis 45 (the reference optical axis "O"), respectively. Further, diameters of the disk prisms 63 and 64 are set so that a sufficient light amount can be obtained by considering a spread of the reflected distance measuring light 48.

A ring gear 69 is fitted on an outer periphery of the disk prism 63, and a ring gear 71 is fitted on an outer periphery of the disk prism 64.

A driving gear 72 meshes with the ring gear 69, and the driving gear 72 is fixed to an output shaft of a motor 73. Similarly, a driving gear 74 meshes with the ring gear 71, and the driving gear 74 is fixed to an output shaft of a motor 75. The motors 73 and 75 are electrically connected to the first motor driver 31. Further, the motors 73 and 75 constitute a rotation driving module of the optical axis deflector 36.

As the motors 73 and 75, the motors which are capable of detecting the rotation angle are used, or the motors which rotate corresponding to a driving input value such as the pulse motors are used. Alternatively, a rotation angle detector which detects the rotation amounts (rotation angles) of the motors such as the encoder, for instance, may be used, and the rotation amounts of the motors 73 and 75 may be detected by the rotation angle detector. The rotation amounts of the motors 73 and 75 are detected respectively, and the arithmetic control module 26 individually controls the motors 73 and 75 via the first motor driver 31. It is to be noted that the encoders may be attached directly to the ring gears 69 and 71, respectively, so that the rotation angles of the ring gears 69 and 71 are directly detected by the encoder.

The driving gears 72 and 74 and the motors 73 and 75 are provided at the positions not interfere with any other constituent module such as the distance measuring light projecting module 21. For instance, the driving gears 72 and 74 and the motors 73 and 75 are provided at the lower side of the ring gears 69 and 71.

Figure 5A:
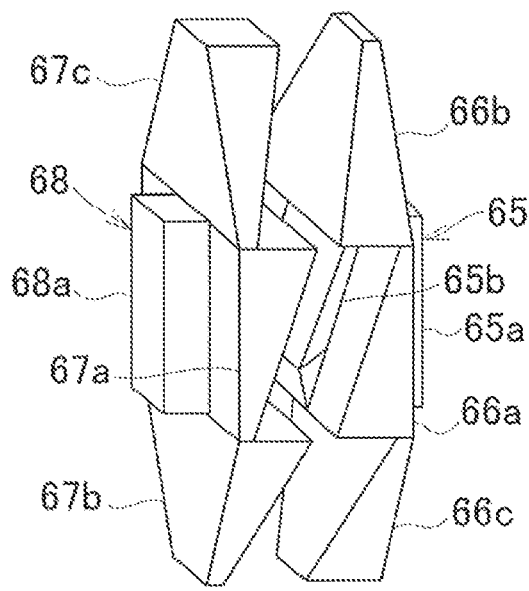
FIG. 5A is a perspective view of the optical axis deflector and FIG. 5B is an enlarged view of an essential part of a wavelength dispersion compensation prism.
Figure 5B:
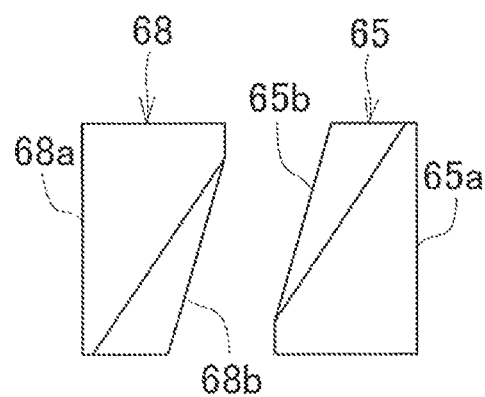

As shown in FIG. 5B, the wavelength dispersion compensation prism 65 is constituted by attaching the two optical prisms 65a and 65b having the different wavelength characteristics (the dispersion amounts, the refractive indexes) to each other. It is to be noted that the wavelength dispersion compensation prism 65 may be an achromatic prism which has three or more optical prisms with the different wavelength characteristics attached to each other and be configured to acquire the red and near infrared images alone. Further, as optical prisms 65a and 65b, the optical glass or the optical plastic may be used, and the optical glass and the optical plastic may be combined.

Similarly, as shown in FIG. 5B, the wavelength dispersion compensation prism 68 is constituted by attaching the two optical prisms 68a and 68b having the different wavelength characteristics (the dispersion amounts, the refractive indexes) to each other. It is to be noted that the wavelength dispersion compensation prism 68 may be an achromatic prism which has three or more optical prisms with the different wavelength characteristics attached to each other and be configured to acquire the red and near infrared images alone. Further, as optical prisms 68a and 68b, the optical glass or the optical plastic may be used, and the optical glass and the optical plastic may be combined.

Figure 7:
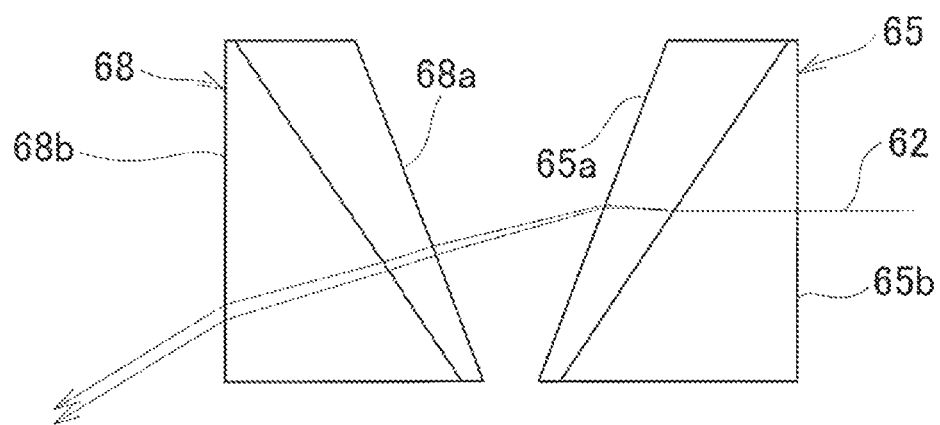
FIG. 7 is an explanatory drawing illustrating an action of the wavelength dispersion compensation prism according to the present embodiment.

As shown in FIG. 7, in a case where the light in a predetermined wavelength band (for instance, the background light) 62 is sequentially transmitted through the wavelength dispersion compensation prisms 65 and 68, the light 62 dispersed by the optical prism 65a is sequentially dispersed in an opposite direction by the optical prism 65b, the optical prism 68a and the optical prism 68b. That is, the light 62 dispersed by the wavelength dispersion compensation prism 65 is dispersed in the opposite direction by the wavelength dispersion compensation prism 68, and a dispersing function of the wavelength compensation prism 65 is canceled out by the wavelength dispersion compensation prism 68. Therefore, the wavelength dispersion of the light 62 sequentially transmitted through the wavelength dispersion compensation prisms 65 and 68 is suppressed.

It is to be noted that, in the present embodiment, the wavelength dispersion compensation prisms 65 and 68 have a function to compensate the wavelength dispersion of the tracking light reflected on the object (the reflected tracking light) or the background light for the acquisition of a narrow-angle image (to be described later) for the sighting or the like. For instance, the wavelength dispersion compensation prisms 65 and 68 transmit through the light in a wavelength band ranging from 650 nm to 850 mm (the red to the near infrared) in the reflected tracking light or the background light, and compensate the wavelength dispersion.

FIG. 6 is a graph showing an error example with respect to a wavelength of the light such as the reflected tracking light in a case where a deflection angle of the distance measuring optical axis 49 and the tracking optical axis 54 is 30°. In FIG. 6, a reference numeral 81 denotes an error when the normal prism (the triangular prism) is used, and a reference numeral 82 denotes an error when the wavelength dispersion compensation prisms 65 and 68 are used.

As shown in FIG. 6, in case of the normal prisms, when the light having a wavelength of approximately 800 nm is used, an error hardly occurs (no dispersion occurs) since a single wavelength is used. However, in case of the normal prisms, when a wavelength band of the used light expands, the error exponentially increases (the dispersion occurs). For instance, in case of acquiring an image with the use of the light in a wavelength band of 650 nm to 850 nm, the large dispersion occurs in the range of approximately −400.0 to 1400.0 seconds, and the acquired image is a considerably blurred image. To reduce the blur, the wavelength band must be narrowed, and the dispersion must be decreased. In this case, a sufficient light quantity cannot be obtained, and the image becomes dark, and hence an exposure time must be prolonged for the acquisition of the sufficient light quantity and the acquisition of a bright image.

On the other hand, in a case where the wavelength dispersion compensation prisms 65 and 68 are used, even in the wavelength band of 650 nm to 850 nm, the dispersion can be reduced to the range of −100.0 to 0.0 second. Therefore, even if an exposure time is short, a less blurred fine image having a sufficient light quantity can be acquired, and the precise sighting and the image tracking is enabled.

The light projecting lens 43, the beam splitter 44, the reflecting mirror 46, and the distance measuring light deflector (a first optical axis deflector) constitute a distance measurement light projecting optical system. Further, the split mirror 59, the image forming lens 51, and the reflected distance measuring light deflector (a second optical axis deflector) constitute a tracking light projecting optical system. Further, the distance measuring light deflector (the first optical axis deflector), and the image forming lens 56 constitute a tracking light receiving optical system.

The distance measurement calculation module 25 controls the light emitter 42, and pulse-emits or burst-emits (intermittently emits) a laser beam as the distance measuring light 47. The projecting optical axis 41 is deflected by the wavelength dispersion compensation prisms 65 and 68 (the distance measuring light deflector) in such a manner that the distance measuring light 47 is directed toward the object. In a state where the distance measuring optical axis 49 is sighted on the object, the distance measurement is performed.

The reflected distance measuring light 48 reflected from the object enters via the triangular prisms 66b and 66c, the triangular prisms 67b and 67c (the reflected distance measuring light deflector), and the image forming lens 51, and is received by the photodetector 52. The photodetector 52 transmits a light reception signal to the distance measurement calculation module 25, and the distance measurement calculation module 25 performs the distance measurement of a measuring point (a point irradiated with the distance measuring light) in accordance with each pulsed light based on the light reception signal from the photodetector 52. The distance measurement data is stored in the storage module 27.

The projecting direction detecting module 29 counts the driving pulses input to the motors 73 and 75, and detects the rotation angles of the motors 73 and 75. Alternatively, the projecting direction detecting module 29 detects the rotation angles of the motors 73 and 75 based on the signals from the encoders. Further, the projecting direction detecting module 29 calculates the rotating positions of the disk prisms 63 and 64 based on the rotation angles of the motors 73 and 75. Further, the projecting direction detecting module 29 calculates a deflection angle and a projecting direction of the distance measuring light 47 for each pulsed light based on the refractive indexes and the rotating positions of the disk prisms 63 and 64. The calculation results (the angle measurement results) are associated with the distance measurement results and input to the arithmetic control module 26. It is to be noted that, in a case where the distance measuring light 47 is burst-emitted, the distance measurement is performed in accordance with each intermittent distance measuring light.

When the arithmetic control module 26 controls the rotation amounts and the rotating directions of the respective motors 73 and 75, the arithmetic control module 26 can control a deflection amount and a deflecting direction of the distance measuring optical axis 49 by the optical axis deflector 36. Further, when the arithmetic control module 26 controls the rotating directions and the rotation speeds of the respective motors 73 and 75 and a rotation ratio of the motors 73 and 75, the arithmetic control module 26 can dynamically control a deflecting function by the optical axis deflector 36 and perform a scan using the distance measuring optical axis 49 in an arbitrary direction with an arbitrary pattern.

A description will be given on a deflecting function and a scan function of the optical axis deflector 36 by referring to FIG. 4, FIG. 5, and FIG. 8.

Figure 4:
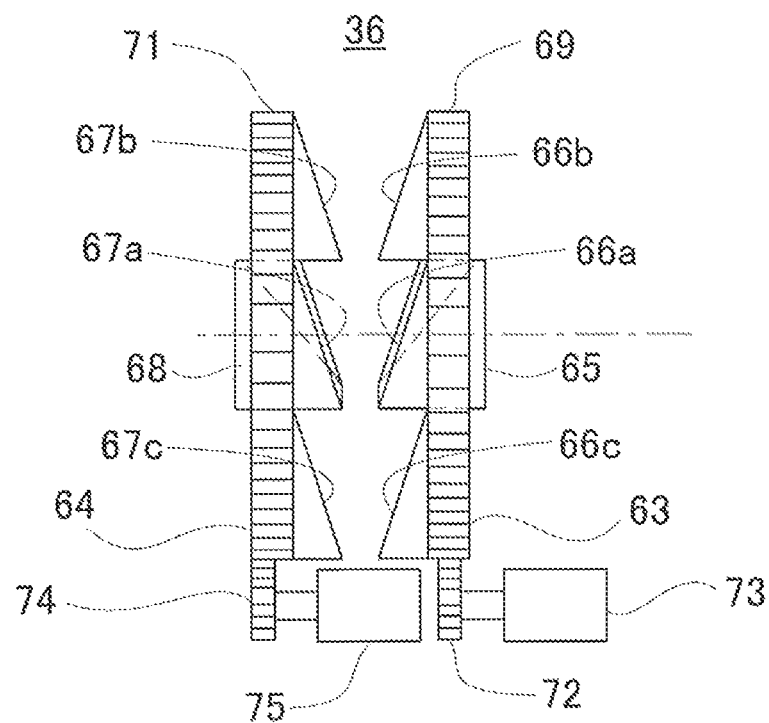
FIG. 4 is a front view of an optical axis deflector in the surveying instrument.

FIG. 4 shows a state where the triangular prisms 66a, 66b, and 66c and the triangular prisms 67a, 67b and 67c are placed in the same direction, and a maximum deflection angle (for instance, ±30°) can be obtained in this state. Further, in FIG. 5, one of the disk prisms 63 and 64 has rotated 180°, and the mutual optical functions of the disk prisms 63 and 64 are canceled out and a minimum deflection angle (0°) is obtained in this state. Therefore, an optical axis of a pulsed laser beam (the distance measuring optical axis 49) projected and received through the disk prisms 63 and 64 coincides with the reference optical axis "O".

The distance measuring light 47 is emitted from the light emitter 42, and the distance measuring light 47 is turned to a parallel light flux by the light projecting lens 43, transmitted through the distance measuring light deflector (the wavelength dispersion compensation prisms 65 and 68) and projected toward the object. Here, when the distance measuring light 47 is transmitted through the distance measuring light deflector, the distance measuring light 47 is deflected to a necessary direction by the wavelength dispersion compensation prisms 65 and 68 and projected. It is to be noted that, since the distance measuring light 47 is a laser beam having a single wavelength or a substantially single wavelength, the dispersion when this light is transmitted through the optical axis deflector 36 is slight.

The reflected distance measuring light 48 reflected on the object is transmitted through the reflected distance measuring light deflector, and enters the image forming lens 51. Further, the reflected distance measuring light 48 is collected on the photodetector 52 by the image forming lens 51.

When the reflected distance measuring light 48 is transmitted through the reflected distance measuring light deflector, an optical axis of the reflected distance measuring light 48 is deflected by the triangular prisms 66b and 66c and the triangular prisms 67b and 67c in such a manner that it coincides with the light receiving optical axis 45.

Figure 8:
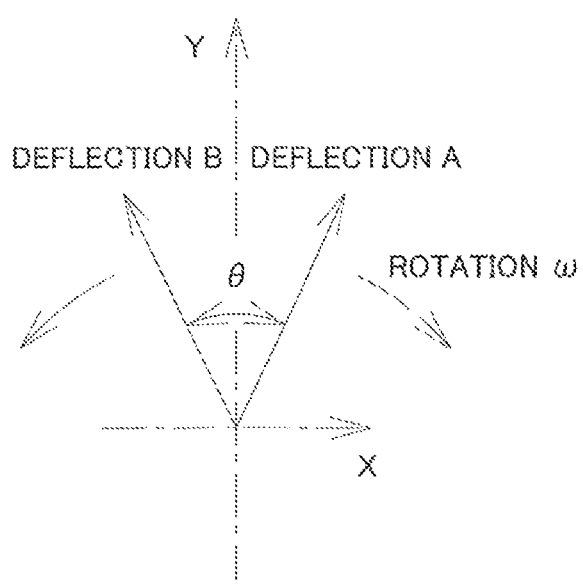
FIG. 8 is an explanatory drawing illustrating a relationship between the deflecting directions of the respective disk prisms and a synthetic deflecting direction.

FIG. 8 shows a case where the disk prism 63 and the disk prism 64 are relatively rotated. Assuming that the deflecting direction of the optical axis deflected by the disk prism 63 is a deflection "A" and a deflecting direction of the optical axis deflected by the disk prism 64 is a deflection "B", the deflection of the optical axis by the disk prisms 63 and 64 become a synthetic deflection "C" as an angular difference "0" between the disk prisms 63 and 64.

By combining the rotating positions of the disk prism 63 and the disk prism 64, a deflecting direction and a deflection angle of the distance measuring light 47 to be projected enables arbitrarily changing.

Further, in a state where a positional relationship between the disk prism 63 and the disk prism 64 is fixed (in a state where a deflection angle obtained by the disk prism 63 and the disk prism 64 is fixed), in a case where the disk prism 63 and the disk prism 64 are integrally rotated by the motors 73 and 75, a locus (a scan pattern) drawn by the distance measuring light 47 transmitted through the distance measuring light deflector becomes a circle having the reference optical axis "O" as a center. Further, by combining the rotation of the disk prism 63 with the rotation of the disk prism 64, the distance measuring light 47 enables forming a necessary two-dimensional closed loop scan pattern.

The arithmetic control module 26 calculates a horizontal angle and a vertical angle of a measuring point with respect to the reference optical axis "O" based on a deflection angle and a projecting direction of the distance measuring light 47, that is, a detection result of the projecting direction detecting module 29. Further, when the arithmetic control module 26 associates the horizontal angle and the vertical angle of the measuring point with the distance measurement data, the arithmetic control module 26 can acquire the three-dimensional data of the object.

Furthermore, in a case where a direction angle exceeding a maximum deflection angle by the optical axis deflector 36 is required, the distance measurement calculation module 25 controls the horizontal motor 13 and the vertical motor 17 via the second motor driver 32, and irradiates a measuring point with the distance measuring light 47.

In this case, based on a horizontal angle and a vertical angle of the distance measuring optical axis 49 at the measuring point with respect to the reference optical axis "O" and a horizontal angle and a vertical angle of the reference optical axis "O" detected by the horizontal angle detector 9 and the vertical angle detector 18 with respect to the horizontality (or the verticality), an actual horizontal angle and vertical angle at the measuring point (a horizontal angle and a vertical angle with respect to the horizontality (or the verticality)) is acquired. Further, when the actual horizontal angle and vertical angle are corrected based on a detection result of the attitude detector 28, an accurate horizontal angle and vertical angle can be acquired. When the corrected horizontal angle and vertical angle are associated with the distance measurement data, the three-dimensional data of the measuring point can be obtained.

Therefore, the surveying instrument system 1 functions as a total station.

The wide-angle image pickup module 24 has an image pickup optical axis 76 parallel to the reference optical axis "O" of the surveying instrument 3, and an image pickup lens 77 and an image pickup element 78 which are disposed on the image pickup optical axis 76. The wide-angle image pickup module 24 is a camera having a field angle of 60° which is substantially equal to a maximum defection angle (for instance, ±30°) of the disk prisms 63 and 64 or a field angle larger than the maximum deflection angle, for instance, a field angle which is 65° to 70° of the disk prisms 63 and 64. The wide-angle image pickup module 24 acquires the image data including a maximum deflection range provided by the optical axis deflector 36.

A relationship among the image pickup optical axis 76, the projecting optical axis 41 and the reference optical axis "O" is known. The image pickup optical axis 76, the projecting optical axis 41 and the reference optical axis "O" are parallel, and the distances among the respective optical axes have the known values. Further, the wide-angle image pickup module 24 can acquire the video images or the continuous images.

The image pickup control module 33 controls the image pickup of the wide-angle image pickup module 24. In a case where the wide-angle image pickup module 24 acquires the video images or the continuous images, the image pickup control module 33 synchronizes a timing to acquire the video image or a frame image constituting the continuous images with a timing to perform the distance measurement using the surveying instrument 3. Further, in a case where each image is acquired by the narrow-angle image pickup module 88 (see FIG. 3), a timing to acquire the image by the narrow-angle image pickup module 88 is synchronized with a timing to perform the distance measurement.

Since the narrow-angle image pickup module 88 acquires an image of an irradiation point of the distance measuring light 47, the narrow-angle image pickup module 88 functions as a finder of a distance measuring portion. Further, since an image to be acquired by the narrow-angle image pickup module 88 is an image of a narrow field angle (for instance, 3°) near the distance measuring optical axis 49, a distortion is small. Further, since an image acquired by the narrow-angle image pickup module 88 is acquired with the use of the background light alone which has been transmitted through the wavelength dispersion compensation prisms 65 and 68, the dispersion of the wavelength is compensated, and a less distorted or blurred fine image is acquired.

Here, as to the image acquired by the narrow-angle image pickup module 88, in a case where a synthetic deflection "C" direction is determined as a "Y" axis direction (see FIG. 8), a magnification in the "Y" axis direction varies in correspondence with the magnitude of the angle difference "θ" between the disk prism 63 and the disk prism 64.

Figure 9A:
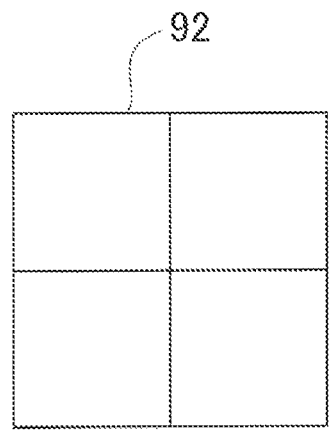
FIG. 9A shows a narrow-angle image in a state where a magnification in a "Y" axis direction is not changed.
Figure 9B:
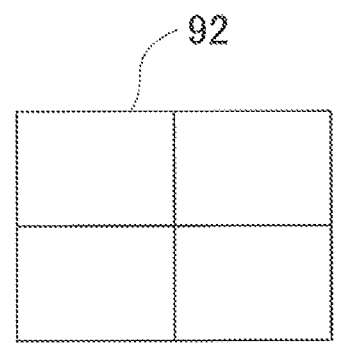
FIG. 9B shows a narrow-angle image in a state where the magnification in the "Y" axis direction has been changed.

FIG. 9A and FIG. 9B show a narrow-angle image 92 acquired by the narrow-angle image pickup module 88. It is to be noted that FIG. 9A shows a case where a magnification of the narrow-angle image 92 in the "Y" axis direction does not change. Further, FIG. 9B shows a case where the magnification of the narrow-angle image 92 in the "Y" axis direction has changed and the narrow-angle image 92 has reduced in the "Y" axis direction.

Figure 10:
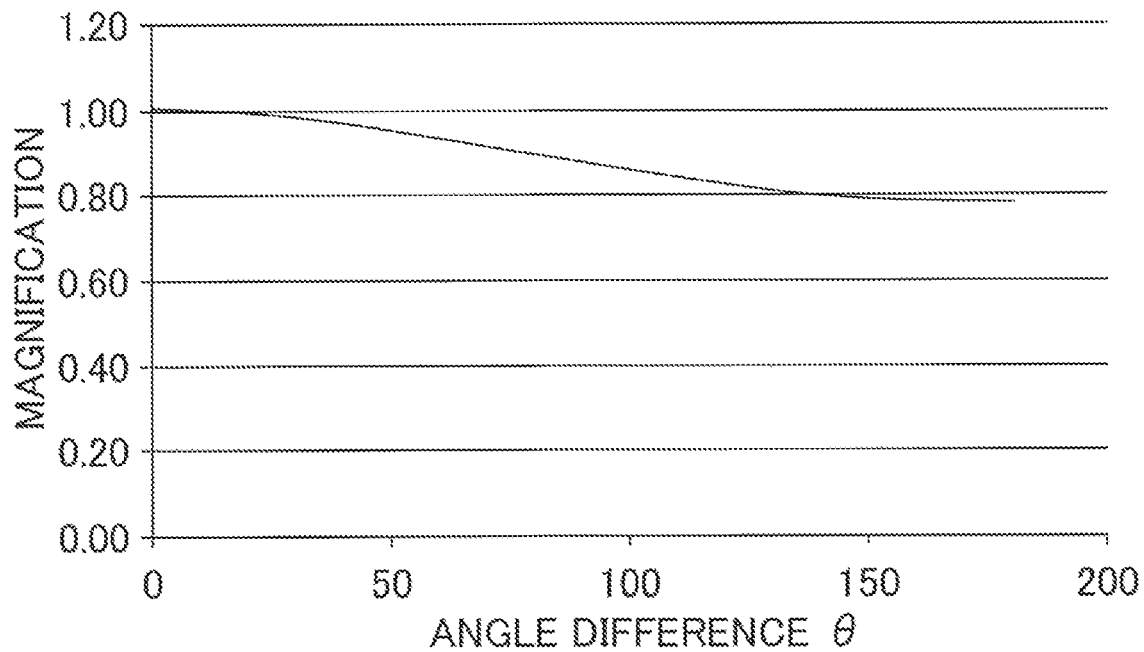
FIG. 10 is a graph showing the angle difference and the change in the magnification in the "Y" axis direction of each disk prism.

Further, FIG. 10 is a graph showing a relationship between the angle difference θ between the disk prism 63 and the disk prism 64 and a change in magnification in the "Y" axis direction. As shown in FIG. 10, the magnification of the narrow-angle image 92 in the "Y" axis direction changes as the angle difference θ increases, and the magnification in the "Y" axis direction changes approximately 20% at most. Further, the relationship between the angle difference θ and the magnification in the "Y" axis direction can be known in advance by the actual measurement.

The arithmetic control module 26 also associates an image of a narrow field angle (a narrow-angle image) with the measurement data (the distance measurement data, the angle measurement data).

The image pickup element 78 is a CCD or a CMOS sensor which is an aggregate of pixels, and each pixel can specify a position on the image pickup element 78. For instance, each pixel has pixel coordinates in a coordinate system with the image pickup optical axis 76 as an origin, and a position of each pixel on the image pickup element 78 is specified by the pixel coordinates. Further, since the image pickup optical axis 76 of the wide-angle image pickup module 24 and the tracking optical axis 54 have a known positional relationship, an image acquired by the wide-angle image pickup module 24 (a wide-angle image) can be readily associated with a narrow-angle image acquired by the narrow-angle image pickup module 88.

Regarding the image data acquired by the wide-angle image pickup module 24, the image processing module 34 executes the image processing, for instance, the edge extraction processing, the extraction of the feature points, the detection of the object, the image tracking processing and the image matching processing. Further, the image processing module 34 creates a gray image from the image data. Further, when the narrow-angle image 92 has been acquired, based on a known relationship between the angle difference "θ" and the magnification in the "Y" axis direction, the image processing module 34 corrects the narrow-angle image 92 in such a manner that the magnification in the "Y" axis direction becomes 1.

The display unit 35 displays an image acquired by the wide-angle image pickup module 24, and also displays the narrow-angle image 92 acquired by the narrow angle image pickup module 88. Further, the display unit 35 has divided a display screen, displays a wide-angle image acquired by the wide-angle image pickup module 24 in a part of the display screen, and performs the enlarged display of the narrow-angle image 92 acquired by the narrow-angle image pickup module 88 in an enlarged manner in the other part of the display screen.

Figure 11:
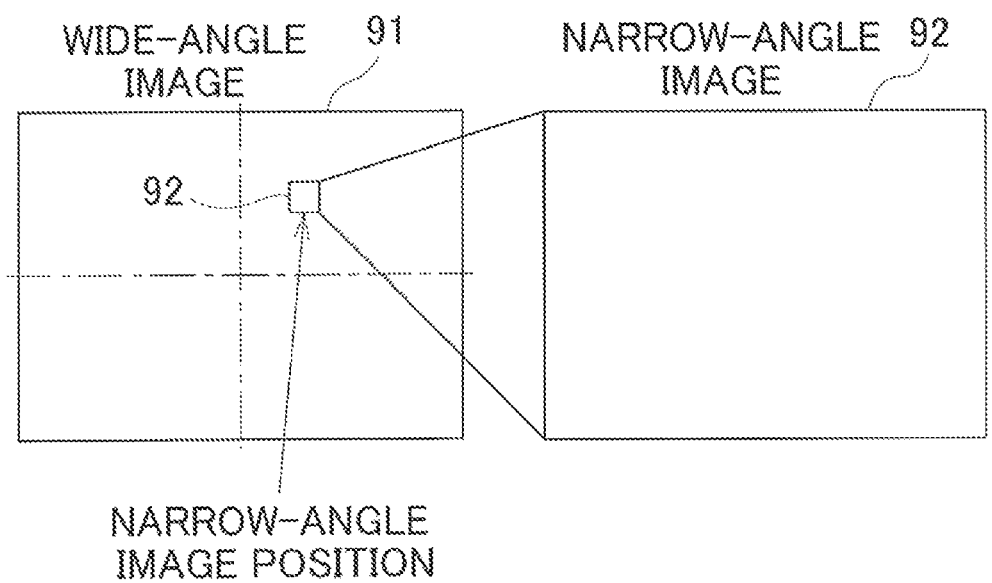
FIG. 11 is an explanatory drawing showing a relationship between a wide-angle image and a narrow-angle image.

Alternatively, as shown in FIG. 11, the narrow-angle image 92 is superimposed on a wide-angle image 91 and the narrow-angle image 92 and the wide-angle image 91 are displayed. As described above, the reference optical axis "O" and the image pickup optical axis 76 have a known relationship. Further, a position of a measuring point (a position of a pixel) in the wide-angle image 91 is acquired as a field angle with respect to the reference optical axis "O". Further, a direction angle of the center of the narrow-angle image 92 with respect to the reference optical axis "O" (a direction angle of the distance measuring light 47) is detected by the projecting direction detecting module 29. Therefore, by the use of the field angle in the wide-angle image 91 and the direction angle of the narrow-angle image 92, the narrow-angle image 92 can be readily superimposed on the wide-angle image 91. When the narrow-angle image 92 is superimposed on the wide-angle image 91, it is possible to easily recognize which position on the object is being measured.

It is to be noted that, as a method for displaying in the superimposed images, the various methods can be adopted. These methods include: a method of displaying the narrow-angle image 92 on the wide-angle image 91 at the same magnification, a method of indicating a position at which the narrow-angle image 92 is displayed with a point, a method of indicating the position at which the narrow-angle image 92 is displayed with a symbol such as an arrow or the like.

Further, by superimposing the wide-angle image 91 and the narrow-angle image 92 at the same magnification, the image processing module 34 enables correcting a distortion of the wide-angle image 91 with the use of the direction angle data of the narrow-angle image 92 and acquiring the wide-angle image 91 whose distortion has been corrected.

Further, the display unit 35 displays a measurement situation, the measurement data, and others. It is to be noted that the display unit 35 is configured as a touch panel and also functions as an operation module. Further, the display unit 35 having a touch panel function may be attachable to and detachable from the surveying instrument 3 so that the remote operation using the display unit 35 can be performed.

A description will be given below on a function of the surveying instrument system 1 according to the present embodiment. It is to be noted that the following operation is preferred by mainly the arithmetic control module 26 which executes the programs stored in the storage module 27.

The surveying instrument system 1 is installed on a known point (a point whose three-dimensional coordinates are known) via the tripod 2.

The surveying instrument 3 has the attitude detector 28. The attitude detector 28 enables detecting an installation attitude (a tilt) of the surveying instrument 3 with respect to the horizontality. For this reason, a leveling operation of the surveying instrument 3 is not required. By correcting a measurement result with the use of a detected tilt, the arithmetic control module 26 enables acquiring an accurate measurement result.

The reference optical axis "O" is directed toward the object (a measuring point).

As a method for directing the reference optical axis "O" with respect to the object (the measuring point), in a state where the distance measuring optical axis 49 coincides with the reference optical axis "O", that is, a state where the distance measuring optical axis 49 is not deflected by the optical axis deflector 36, the reference optical axis "O" is sighted on the object. In a sighting state, the narrow-angle image 92 acquired by the narrow-angle image pickup module 88 is displayed in the display unit 35, and a worker confirms. (In the following description, a case where the tracking module 23 also serves as the narrow-angle image pickup module 88 will be described.)

Alternatively, the wide-angle image pickup module 24 is directed toward the object, a wide-angle image including the object is acquired, and the wide-angle image is displayed in the display unit 35. Further, a narrow-angle image acquired by the narrow-angle image pickup module 88 is superimposed on the wide-angle image and displayed in the display unit 35, the deflection by the optical axis deflector 36 is adjusted, and the center of the narrow-angle image (a sighting position of the distance measuring light 47) is matched with the object in the wide-angle image. In this case, a deflection angle of the distance measuring light 47 (that is, the respective rotation angles of the disk prisms 63 and 64) when the distance measuring light 47 is sighted is also acquired.

It is to be noted that, as a method for operating the optical axis deflector 36 and eventually sighting the distance measuring optical axis 49 on the measuring point, a worker may perform by a manual operation from the display unit 35 while confirming the display in the display unit 35. Alternatively, the image processing module 34 may detect the object, and the arithmetic control module 26 may automatically perform a method of sighting based on a detection result.

Here, in the narrow-angle image 92, the dispersion of the background light is suppressed by the wavelength dispersion compensation prisms 65 and 68, and the magnification in the "Y" axis direction is corrected by the image processing module 34. Therefore, the less blurred or distorted fine narrow-angle image 92 having a sufficient light quantity is acquired, and the sighting and the confirmation of the sighting can be easily performed.

The distance measurement is carried out when the distance measuring optical axis 49 has been sighted on the measuring point, and a direction angle of the distance measuring optical axis 49 in the distance measurement is calculated based on the rotation angles of the horizontal angle detector 9, the vertical angle detector 18 and the disk prisms 63 and 64. The three-dimensional coordinates of the measuring point are measured by a distance measurement value and the direction angle.

It is to be noted that, in a case where the surveying instrument 3 tilts with respect to the horizontality, a tilt angle is detected by the attitude detector 28, and the measured three-dimensional coordinates are corrected based on the tilt angle.

In a case where there is a plurality of measuring points, the distance measuring optical axis 49 is sequentially sighted on the measuring points, and the measurement is performed.

The measurement results of the measuring points are associated with the measuring points respectively and stored in the storage module 27.

Next, a description will be given on a case where the measurement is performed while tracking the object such as the survey setting. Here, the object is an optical member having the retroreflective properties such as a prism, and a measuring point is indicated by the object.

In a state where the object has been captured by the wide-angle image pickup module 24, the distance measuring optical axis 49 is sighted on the object. It is to be noted that, at this moment, the reference optical axis "O" may or may not coincide with the distance measuring optical axis 49.

The tracking light source 55 is turned on, and the tracking light 57 is emitted. The tracking light 57 is an unpolarized light beam. Further, the tracking light 57 has a predetermined spread. It is to be noted that the distance measuring light 47 is an S-polarized laser beam.

The tracking light 57 is deflected by the reflecting mirror 58, and reflected by 30% by the split mirror 59 which is a non-polarization split mirror which performs the 70% transmission and the 30% reflection. The tracking light 57 reflected by the split mirror 59 is turned to a parallel light flux having substantially the same diameter as the diameters of the disk prisms 63 and 64 by the image forming lens 51, transmitted through the optical axis deflector 36, and irradiates the object, and the tracking is started.

The reflected tracking light from the object is transmitted through the optical axis deflector 36, and the light flux, which has been transmitted through the wavelength dispersion compensation prisms 65 and 68, alone in the reflected tracking light is reflected by the reflecting mirror 46.

The reflected tracking light reflected by the reflecting mirror 46 is transmitted through the beam splitter 44 by 50%, and image-formed on the tracking image pickup element 61 by the image forming lens 56.

A light reception signal from the tracking image pickup element 61 is input to the tracking calculation module 37. The tracking calculation module 37 calculates a light receiving position on the tracking image pickup element 61 based on the light reception signal, and determines a tracking state.

The tracking calculation module 37 determines that the distance measuring optical axis 49 is accurately tracking the object if a position of the reflected tracking light on the tracking image pickup element 61 coincides with a reference position, for instance, a position of the tracking light receiving optical axis 54'. Further, the tracking calculation module 37 controls the optical axis deflector 36 in such a manner that the light receiving position of the reflected tracking light coincides with the reference position. That is, the tracking calculation module 37 controls the rotating directions and the rotation amounts of the disk prisms 63 and 64 of the optical axis deflector 36, controls a deflection angle and a deflecting direction of the distance measuring optical axis 49, and performs the tracking of the object.

It is to be noted that the tracking calculation module 37 may calculate the light receiving position of the reflected tracking light and output a calculation result to the arithmetic control module 26, and the arithmetic control module 26 may control the optical axis deflector 36 and control the tracking.

The deflection of the distance measuring optical axis 49 in the tracking operation is caused by the respective rotations of the disk prism 63 and the disk prism 64. Since the disk prisms 63 and 64 are small and lightweight, the disk prisms 63 and 64 can be rotated at a high speed and a high responsiveness by the motors 73 and 75.

Therefore, an improvement in responsiveness of the tracking operation and an increase in tracking speed are possible, the follow-up performance is improved with respect to the object which moves at a high speed.

The projecting direction detecting module 29 calculates a deflection angle of the distance measuring optical axis 49 with respect to the reference optical axis "O" based on the detection results of the rotation amounts and the rotating directions of the disk prisms 63 and 64, and outputs a calculation result to the arithmetic control module 26.

The arithmetic control module 26 drives the horizontal motor 13 and the vertical motor 17 based on the calculation result of the projecting direction detecting module 29 in such a manner that the deflection angle with respect to the reference optical axis "O" becomes 0, and rotates the surveying instrument 3 in the horizontal direction and the vertical direction.

Therefore, in a case where the object moves beyond a maximum deflection angle of the optical axis deflector 36, the tracking is possible in the range of the whole circumference, that is, 360° and the longitudinal range exceeding the maximum deflection angle. It is to be noted that the rotation responsiveness, a horizontal rotation speed, and a vertical rotation speed of the surveying instrument 3 cannot be said as being fast, but the follow-up is effected by the optical axis deflector 36 at a high speed. Therefore, even the follow-up in the range exceeding the maximum deflection angle of the optical axis deflector 36 has no problem in the follow-up performance.

It is to be noted that, in a case where the movement of the object is slow, that is, in a case where the surveying instrument 3 itself can follow the movement of the object, the tracking is performed in a state where the reference optical axis "O" coincides with the distance measuring optical axis 49.

Further, in a case where the distance measurement is performed in a state where the reference optical axis "O" deviates from the distance measuring optical axis 49, a direction angle of the object with respect to an installing position of the surveying instrument 3 is calculated based on a deflection angle and a direction of the distance measuring optical axis 49 acquired from a relative angle and a relative rotating direction between the disk prisms 63 and 64, and a horizontal angle and a vertical angle detected by the horizontal angle detector 9 and the vertical angle detector 18.

Based on a direction angle of the object with respect to the installing position and a distance measurement result, the three-dimensional coordinates of a measuring point with reference to an installing point of the surveying instrument 3 are measured.

In a case where there are a plurality of measuring points, the three-dimensional coordinates of each measuring point are stored in the storage module 27. Further, the arithmetic control module 26 can superimpose each measuring point on the wide-angle image 91 acquired by the wide-angle image pickup module 24 based on the three-dimensional coordinates of each measuring point, and display each measuring point and the wide-angle image 91 in the display unit 35. When each measuring point is displayed on the wide-angle image 91, a progress status of the measurement, the measurement positions, the measuring points which have been already measured, and the measuring points which are not yet to be measured become clear, and the overlapping measurement and a lack of measurement can be avoided.

As described above, in case of superimposing the narrow-angle image 92 or the measuring point on the wide-angle image 91, an optical axis of the light receiving module 22, an optical axis of the tracking module 23 and an optical axis of the wide-angle image pickup module 24 have a known positional relationship, and the relationship is fixed. Therefore, it is needless to say that the narrow-angle image 92 or the measuring point can be superimposed on the wide-angle image 91 with the use of the angle information (the deflection angle information of the distance measuring optical axis 49) of each of the disk prisms 63 and 64 alone.

In the tracking operation, in a case where the tracking by the tracking module 23 is interrupted by the sudden movement of the object, the tracking state can be restored based on the wide-angle image 91 acquired by the wide-angle image pickup module 24.

The image processing module 34 detects the object in the wide-angle image 91 by the image processing, and calculates a position of the object in the wide-angle image 91. A calculation result is input to the arithmetic control module 26.

A positional relationship (a distance) between the image pickup optical axis 76 and the distance measuring optical axis 49 is known. Therefore, the arithmetic control module 26 calculates a position of the object with respect to the reference optical axis "O" (a deflection angle of the distance measuring optical axis 49 with respect to the reference optical axis "O") based on the position of the object in the wide-angle image 91. The arithmetic control module 26 controls the optical axis deflector 36 in such a manner that the distance measuring optical axis 49 becomes the calculated deflection angle.

It is to be noted that the detection of the object by the image processing module 34 may be performed when the tracking is interrupted or may be constantly continuously performed.

In the above embodiment, the description has been given on a case where the distance measuring light 47 and the tracking light 57 have the same wavelength, but the wavelength of the distance measuring light may be different from the wavelength of the tracking light. In this case, as each of the split mirror 59 and the beam splitter 44, a dichroic mirror having a wavelength selecting function is used. Further, it is preferable to use a dichroic mirror as at least the beam splitter 44.

In a case where the wavelengths are different, since a difference is produced in a refraction state at the time of passing through the disk prisms 63 and 64, and a deviation is produced in the direction angles. However, the deviation of the direction angles can be calculated from the wavelengths and the refractive indexes of the disk prisms 63 and 64, and hence the deviation of the direction angles may be corrected by the arithmetic control module 26 based on a calculation result.

In the above embodiment, the description has been given on the case where the surveying instrument 3 is fixed on the tripod 2. On the other hand, a worker can hold and carry the surveying instrument 3 alone, and measure a measuring point.

In a state where the worker carries the instrument, an attitude of the surveying instrument 3 is unstable, and the distance measuring optical axis 49 directed to a measuring point also fluctuates. However, since the distance measuring optical axis 49 is deflected at a high speed by the optical axis deflector 36 and the measuring point can be tracked, the distance measuring optical axis 49 can be accurately directed to the measuring point even if the hands movement occurs, and the highly accurate measurement can be carried out. It is to be noted that, needless to say, an attitude (a tilt) of the surveying instrument 3 is detected by the attitude detector 28 in real time, and the optical axis deflector 36 is controlled by the arithmetic control module 26 based on a detection result of the attitude detector 28.

Further, even in a state where a worker carries the surveying instrument 3, the object can be tracked.

Further, in the above description, the surveying instrument 3 has been described as a total station. On the other hand, continuously rotating the respective disk prisms 63 and 64 of the optical axis deflector 36, and individually controlling the rotation speeds and the rotating directions of the respective disk prisms 63 and 64 enable performing a scan using the distance measuring optical axis 49 in an arbitrary pattern. Further, when the distance measurement is performed in accordance with each pulsed light during the scan, the point cloud data can be acquired along a scanning line, and the surveying instrument 3 can be also used as a laser scanner.

As described above, by individually controlling the rotations of the disk prism 63 and the disk prism 64, the arithmetic control module 26 enables forming the various two-dimensional scan patterns.

Figure 12:
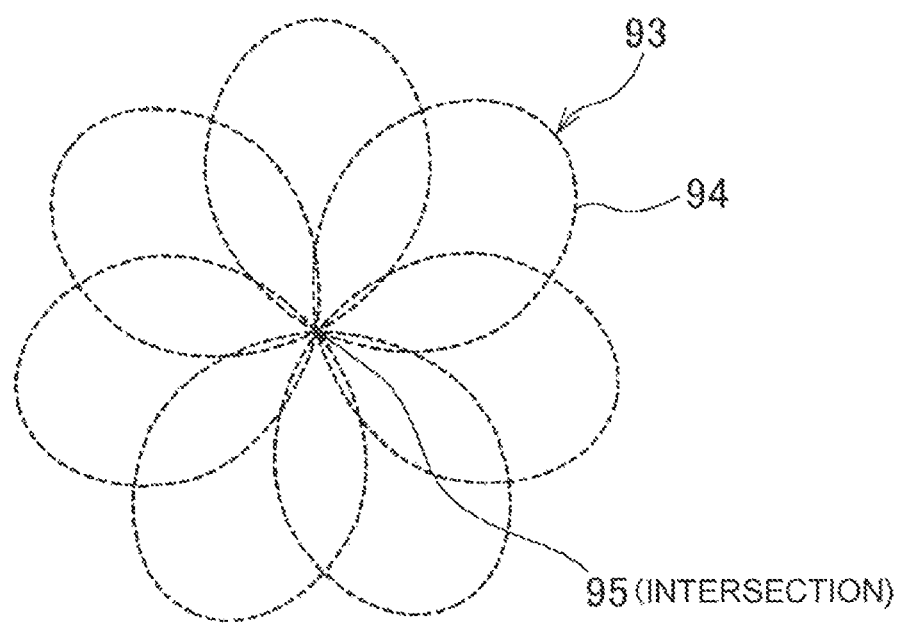
FIG. 12 is a drawing showing an example of a scan pattern.

For instance, when the one disk prism 63 in the disk prism 63 and the disk prism 64 is rotated by 25 rotations and the other disk prism 64 is rotated by 5 rotations in the opposite direction, a flower petal-shaped two-dimensional closed loop scan pattern (a flower petal scan pattern 93 (a hypotrochoid curve)) as shown in FIG. 12 is obtained. It is to be noted that, in FIG. 12, dots on the pattern shows a measuring point 94. Further, in FIG. 12, a reference numeral 95 denotes a center of the flower petal scan pattern 93, and the center of the flower petal scan pattern 93 coincides with the reference optical axis "O". Further, a reference numeral 95 denotes an intersection of the scan loci.

When the point cloud data is acquired along a scan line of the flower petal scan pattern 93, the surveying instrument 3 according to the present embodiment can be used as a laser scanner. Further, when a point cloud density is desired to be increased in case of carrying out the flower petal scan pattern 93, by rotating a whole of the flower petal scan pattern 93 sequentially by a predetermined angle every time the flower petal pattern 93 is carried out by one pattern, the point cloud density can be increased.

It is to be noted that, since the wavelength dispersion compensation prisms 65 and 68 are provided in the disk prisms 63 and 64 respectively, the weight of the disk prisms 63 and 64 is increased as compared with a case where the triangular prisms alone are used. However, the wavelength dispersion compensation prisms 65 and 68 are provided in the central portions of the disk prisms 63 and 64 alone. Therefore, an increase in inertia force with respect to the rotations due to the providing of the wavelength dispersion compensation prisms 65 and 68 is slight, and a reduction in responsiveness, run out of the axis of disk prisms 63 and 64, and the like can be suppressed.

Further, since an image pickup position (an image center) of the narrow-angle image pickup module 88 is the same as the measuring point 94, by synchronizing the image pickup of the narrow-angle image pickup module 88 with the measurement, a still image at an arbitrary point in the scan can be acquired. Since the still image acquired at this moment is compensated for the dispersion by the wavelength dispersion compensation prisms 65 and 68 and corrects the magnification in the "Y" axis direction by the image processing module 34, a less blurred or distorted fine still image can be acquired. Further, when the image is acquired per each measuring point, an image associated with the measuring points can be acquired, and point cloud data with an image can be immediately acquired.

It is to be noted that, in the present embodiment, the wavelength dispersion compensation prisms 65 and 68 are provided in the central portions alone of the disk prisms 63 and 64. On the other hand, it is needless to say that the wavelength dispersion compensation prisms can be adopted as the respective triangular prisms constituting the disk prisms 63 and 64.

The invention claimed is:

1. A surveying instrument comprising: a distance measuring light projecting module which has a light emitter and a light projecting lens and is configured to project a laser beam emitted from said light emitter as a distance measuring light onto a distance measuring optical axis via said light projecting lens, a light receiving module which has an image forming lens and a photodetector and is configured to receive a reflected distance measuring light on a light receiving optical axis via said image forming lens by said photodetector, an optical axis deflector which is constituted of a plurality of prisms, including disk prisms and wavelength dispersion compensation prisms, and integrally deflects said distance measuring optical axis and said light receiving optical axis, a wide-angle image pickup module having an image pickup lens and an image pickup element and having substantially the same field angle as a maximum deflection range of said optical axis deflector, a projecting direction detecting module configured to detect an optical axis deflection angle and a deflecting direction by said optical axis deflector, a narrow-angle image pickup module having an image forming lens and a tracking image pickup element and having a field angle narrower than a field angle of said wide-angle image pickup module and having an optical axis a part of which is common to said distance measuring optical axis, a distance measurement calculation module and an arithmetic control module, wherein said wavelength dispersion compensation prisms which are constituted of a plurality of optical members having the different wavelength characteristics are provided in the part of which is common to said distance measuring optical axis and said narrow-angle image pickup optical axis, said arithmetic control module is configured to control the optical axis deflection of said optical axis deflector and a distance measuring operation of said distance measurement calculation module, said distance measurement calculation module is configured to perform the distance measurement of a measuring point based on a signal of said distance measuring light and a signal of said reflected distance measuring light, and said narrow-angle image pickup module is configured to acquire a narrow-angle image in which the dispersion has been compensated by said wavelength dispersion compensation prisms.

2. The surveying instrument according to claim 1, wherein said optical axis deflector includes two disk prisms which are concentrically provided, and each of said disk prisms is constituted of a plurality of prisms having the same optical deflection characteristics, independently rotatable around said distance measuring optical axis and said light receiving optical axis, and has said wavelength dispersion compensation prism as a prism in at least a central portion.

3. The surveying instrument according to claim 2, wherein said arithmetic control module is configured to independently control the rotations of said two disk prisms, subject said distance measuring light to the two-dimensional closed loop scan and acquire point cloud data.

4. The surveying instrument according to claim 3, wherein said arithmetic control module is configured to synchronize a distance measurement timing with the image acquisition performed by said narrow-angle image pickup module, and to acquire a still image at an arbitrary position during a scan.

5. A surveying instrument system comprising a surveying instrument according to claim 3, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

6. A surveying instrument system comprising a surveying instrument according to claim 4, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

7. The surveying instrument according to claim 2, further comprising an image processing module, wherein said image processing module is configured to correct a magnification of said narrow-angle image corresponding to an optical axis deflection angle and a deflecting direction based on a detection result of said projecting direction detecting module.

8. The surveying instrument according to claim 7, wherein said narrow-angle image pickup module has a tracking light receiving optical axis branched from a projecting optical axis of said distance measuring light projecting module and a tracking image pickup element provided on said tracking light receiving optical axis, and is configured to acquire said narrow-angle image by said tracking image pickup element via said projecting optical axis.

9. The surveying instrument according to claim 2, wherein said narrow-angle image pickup module has a tracking light receiving optical axis branched from a projecting optical axis of said distance measuring light projecting module and a tracking image pickup element provided on said tracking light receiving optical axis, and is configured to acquire said narrow-angle image by said tracking image pickup element via said projecting optical axis.

10. The surveying instrument according to claim 2, further comprising a tracking module, wherein said tracking module has a tracking optical axis a part of which is common to said light receiving optical axis, a tracking light receiving optical axis branched from a projecting optical axis of said distance measuring light projecting module, a tracking light source provided on said tracking optical axis, and a tracking image pickup element provided on said tracking light receiving optical axis, wherein a tracking light emitted from said tracking light source is configured to be projected through said light receiving optical axis, the tracking light reflected on an object is configured to be received by said tracking image pickup element through said projecting optical axis and said tracking light receiving optical axis, and said arithmetic control module is configured to control the deflection of said optical axis deflector based on a deviation between a tracking light receiving position of said tracking image pickup element and said tracking light receiving optical axis.

11. A surveying instrument system comprising a surveying instrument according to claim 2, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

12. The surveying instrument according to claim 1, further comprising an image processing module, wherein said image processing module is configured to correct a magnification of said narrow-angle image corresponding to an optical axis deflection angle and a deflecting direction based on a detection result of said projecting direction detecting module.

13. The surveying instrument according to claim 12, wherein said narrow-angle image pickup module has a tracking light receiving optical axis branched from a projecting optical axis of said distance measuring light projecting module and a tracking image pickup element provided on said tracking light receiving optical axis, and is configured to acquire said narrow-angle image by said tracking image pickup element via said projecting optical axis.

14. The surveying instrument according to claim 12, further comprising a tracking module, wherein said tracking module has a tracking optical axis a part of which is common to said light receiving optical axis, a tracking light receiving optical axis branched from a projecting optical axis of said distance measuring light projecting module, a tracking light source provided on said tracking optical axis, and a tracking image pickup element provided on said tracking light receiving optical axis, wherein a tracking light emitted from said tracking light source is configured to be projected through said light receiving optical axis, the tracking light reflected on an object configured to be received by said tracking image pickup element through said projecting optical axis and said tracking light receiving optical axis, and said arithmetic control module is configured to control the deflection of said optical axis deflector based on a deviation between a tracking light receiving position of said tracking image pickup element and said tracking light receiving optical axis.

15. A surveying instrument system comprising a surveying instrument according to claim 3, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

16. The surveying instrument according to claim 1, wherein said narrow-angle image pickup module has a tracking light receiving optical axis branched from a projecting optical axis of said distance measuring light projecting module and a tracking image pickup element provided on said tracking light receiving optical axis, and is configured to acquire said narrow-angle image by said tracking image pickup element via said projecting optical axis.

17. A surveying instrument system comprising a surveying instrument according to claim 16, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

18. The surveying instrument according to claim 1, further comprising a tracking module, wherein said tracking module has a tracking optical axis a part of which is common to said light receiving optical axis, a tracking light receiving optical axis branched from a projecting optical axis of said distance measuring light projecting module, a tracking light source provided on said tracking optical axis, and a tracking image pickup element provided on said tracking light receiving optical axis, wherein a tracking light emitted from said tracking light source is configured to be projected through said light receiving optical axis, the tracking light reflected on an object is configured to be received by said tracking image pickup element through said projecting optical axis and said tracking light receiving optical axis, and said arithmetic control module is configured to control the deflection of said optical axis deflector based on a deviation between a tracking light receiving position of said tracking image pickup element and said tracking light receiving optical axis.

19. A surveying instrument system comprising a surveying instrument according to claim 18, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

20. The surveying instrument according to claim 1, wherein said arithmetic control module is configured to associate said narrow-angle image with a wide-angle image based on a deflection angle and a deflecting direction detected by said projecting direction detecting module at the time of the image acquisition performed by said narrow-angle image pickup module and the positions of the pixels in said wide-angle image corresponding to said deflection angle and said deflecting direction.

21. A surveying instrument system comprising a surveying instrument according to claim 20, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

22. A surveying instrument system comprising a surveying instrument according to claim 1, a support device configured to install said surveying instrument, and an installation base unit which is a support module of said surveying instrument, wherein the installation base unit includes rotation driving modules which rotate and drive said surveying instrument in the horizontal direction and the vertical direction and the angle detectors which detect a horizontal rotation angle and a vertical rotation angle, wherein said arithmetic control module is configured to control rotation driving modules of said optical axis deflector, to perform tracking of an object, and to control said rotation driving modules of said installation base unit and said rotation driving modules of said optical axis deflector in such a manner that a deflection angle of a distance measuring optical axis detected by said projecting direction detecting module becomes 0.

* * * * *